United States Patent
Okamoto et al.

(10) Patent No.: US 12,078,097 B2
(45) Date of Patent: Sep. 3, 2024

(54) TURBINE AND TURBOCHARGER

(71) Applicant: IHI Corporation, Tokyo (JP)

(72) Inventors: Shun Okamoto, Tokyo (JP); Yoshiaki Hirai, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/479,298

(22) Filed: Sep. 20, 2021

(65) Prior Publication Data

US 2022/0003151 A1   Jan. 6, 2022

Related U.S. Application Data

(63) Continuation of application No. PCT/JP2020/014893, filed on Mar. 31, 2020.

(30) Foreign Application Priority Data

Apr. 10, 2019  (JP) ................... 2019-075015

(51) Int. Cl.
*F02B 37/02* (2006.01)
*F01D 17/10* (2006.01)
*F02C 6/12* (2006.01)

(52) U.S. Cl.
CPC .......... *F02B 37/025* (2013.01); *F01D 17/105* (2013.01); *F02C 6/12* (2013.01); *F05D 2220/40* (2013.01)

(58) Field of Classification Search
CPC ...... F02B 37/025; F02B 37/18; F02B 37/183; F02B 37/186; F01D 17/105; F02C 6/12; F05D 2220/40; F02M 26/02
See application file for complete search history.

(56) References Cited

U.S. PATENT DOCUMENTS

| | | | | |
|---|---|---|---|---|
| 4,245,953 A | * | 1/1981 | Milton | F02C 9/18 60/602 |
| 4,813,232 A | | 3/1989 | Hitomi et al. | |
| 2007/0089415 A1 | * | 4/2007 | Shimokawa | F02B 37/24 60/605.1 |
| 2008/0098733 A1 | * | 5/2008 | Dickerson | F02B 37/18 60/605.1 |

(Continued)

FOREIGN PATENT DOCUMENTS

| | | |
|---|---|---|
| JP | 61-39438 U | 3/1986 |
| JP | 63-21329 A | 1/1988 |

(Continued)

OTHER PUBLICATIONS

Japanese Office Action issued Sep. 6, 2022 in Japanese Patent Application No. 2021-513589, 4 pages.

(Continued)

*Primary Examiner* — Loren C Edwards
(74) *Attorney, Agent, or Firm* — Oblon, McClelland, Maier & Neustadt, L.L.P.

(57) ABSTRACT

A turbine includes: a turbine impeller accommodated in an accommodation space; two turbine scroll flow paths connected to the accommodation space; a first wastegate flow path (wastegate flow path) opened to one of the turbine scroll flow paths (second turbine scroll flow path) and separated from the other turbine scroll flow path (first turbine scroll flow path), and a valve for opening and closing the first wastegate flow path.

8 Claims, 8 Drawing Sheets

(56) References Cited

U.S. PATENT DOCUMENTS

| | | | |
|---|---|---|---|
| 2009/0028694 A1 | 1/2009 | Naemura et al. | |
| 2011/0088391 A1* | 4/2011 | Sumser | F02B 37/24 60/602 |
| 2014/0294577 A1* | 10/2014 | Yoshida | F04D 29/403 415/204 |
| 2017/0183975 A1 | 6/2017 | Ausbrooks | |
| 2020/0040812 A1 | 2/2020 | Morita et al. | |

FOREIGN PATENT DOCUMENTS

| | | |
|---|---|---|
| JP | 63-117124 A | 5/1988 |
| JP | 2006-348894 A | 12/2006 |
| JP | 2007-154703 A | 6/2007 |
| JP | 2008-101589 A | 5/2008 |
| JP | 2008-196332 A | 8/2008 |
| JP | 2012-219640 A | 11/2012 |
| JP | 2013-142324 A | 7/2013 |
| JP | 2017-516016 A | 6/2017 |
| WO | WO 2018/151267 A1 | 8/2018 |

OTHER PUBLICATIONS

International Search Report issued Jun. 30, 2020 in PCT/JP2020/014893, filed on Mar. 31, 2020, 2 pages.

* cited by examiner

TURBINE AND TURBOCHARGER

CROSS REFERENCE TO RELATED APPLICATIONS

This application is a continuation application of International Application No. PCT/JP2020/014893, filed on Mar. 31, 2020, which claims priority to Japanese Patent Application No. 2019-075015, filed on Apr. 10, 2019, the entire contents of which are incorporated by reference herein.

BACKGROUND ART

Technical Field

The present disclosure relates to a turbine and a turbocharger. The present application claims the benefit of priority based on Japanese Patent Application No. 2019-075015 filed on Apr. 10, 2019, the content of which is incorporated herein.

Related Art

Some turbines included in a turbocharger or the like include two turbine scroll flow paths. For example, in the turbocharger described in Patent Literature 1, a wastegate flow path is formed which opens to inner wall surfaces of two turbine scroll flow paths. In a case where the flow rate of exhaust gas is too high, the exhaust gas flows through the wastegate flow path bypassing a turbine impeller. As a result, overspeeding of the turbocharger is suppressed.

CITATION LIST

Patent Literature

Patent Literature 1: JP 2006-348894 A

SUMMARY

Technical Problem

As described in the above Patent Literature 1, a wastegate flow path opens to inner wall surfaces of turbine scroll flow paths. Even in a case where the wastegate flow path is closed, the flow of exhaust gas is disturbed by the influence of the openings of the wastegate flow paths. This disadvantageously results in a pressure loss of the exhaust gas.

An object of the present disclosure is to provide a turbine and a turbocharger capable of suppressing a pressure loss of the exhaust gas.

Solution to Problem

In order to solve the above problem, a turbine according to an aspect of the present disclosure includes: a turbine impeller accommodated in an accommodation space; two turbine scroll flow paths connected to the accommodation space; a first wastegate flow path communicating with one of the turbine scroll flow paths and separated from the other turbine scroll flow path; and a valve for opening and closing the first wastegate flow path.

A first upstream flow path connected to an upstream side of the other turbine scroll flow path, a downstream flow path positioned downstream with respect to the turbine impeller and communicating with the accommodation space, and a second wastegate flow path connected to the first upstream flow path and the downstream flow path may be further included.

The positions of tongues included in downstream portions of the respective two turbine scroll flow paths may be different from each other in a rotation direction of the turbine impeller.

The positions of tongues included in downstream portions of the respective two turbine scroll flow paths may be the same in the rotation direction of the turbine impeller.

The one of the turbine scroll flow paths may have a smaller flow path cross-sectional area than that of the other turbine scroll flow path.

A second upstream flow path may be further included which is located upstream with respect to the turbine and communicating with the one of the turbine scroll flow paths, the second upstream flow path to which an EGR flow path is opened.

In order to solve the above problem, a turbocharger according to one aspect of the present disclosure includes the turbine described above.

Effects of Disclosure

According to the present disclosure, it is possible to suppress the pressure loss of exhaust gas.

DESCRIPTION OF EMBODIMENTS

An embodiment of the present disclosure will be described in detail below with reference to the accompanying drawings. Dimensions, materials, other specific numerical values, and the like illustrated in embodiments are merely examples for facilitating understanding, and the present disclosure is not limited thereby unless otherwise specified. Note that, in the present specification and the drawings, components having substantially the same function and structure are denoted by the same symbol, and redundant explanations are omitted. Components not directly related to the present disclosure are not illustrated.

Figure 1:
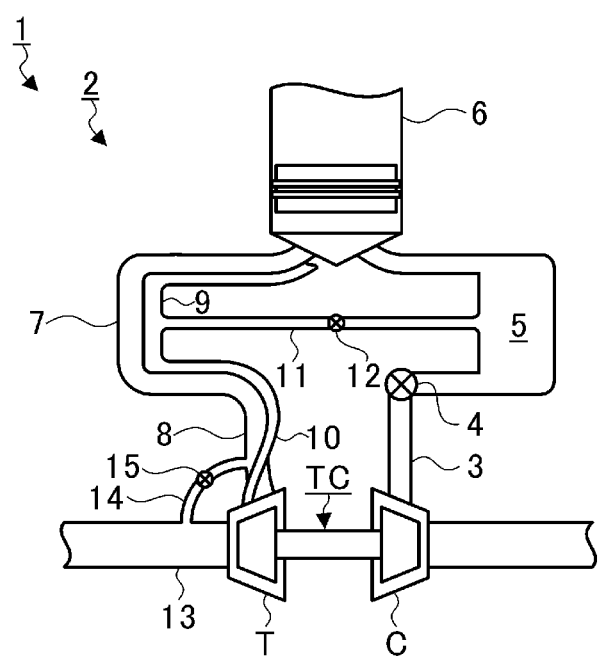
FIG. 1 is a diagram schematically illustrating an engine and an intake and exhaust mechanism of the engine.

FIG. 1 is a diagram schematically illustrating an engine 1 and an intake and exhaust mechanism 2 of the engine 1. As illustrated in FIG. 1, the intake and exhaust mechanism 2 includes a turbocharger TC. A compressor C of the turbocharger TC is provided to an intake flow path 3. A throttle valve 4 and a surge tank 5 are included on the downstream side of the compressor C in the intake flow path 3. Although only one cylinder 6 is illustrated in FIG. 1, the engine 1 includes a plurality of cylinders 6. Intake air is supplied from the surge tank 5 to each of the cylinders 6.

Among the plurality of cylinders 6, exhaust gas discharged from some of the cylinders 6 merge at a first merging portion 7. The first merging portion 7 is connected with a first upstream flow path 8 of the turbine T. Exhaust gas is supplied to the turbine T of the turbocharger TC through the first merging portion 7 and the first upstream flow path 8.

Among the plurality of cylinders 6, exhaust gas discharged from the rest of the cylinders 6 merges at a second merging portion 9. The second merging portion 9 is connected with a second upstream flow path 10 of the turbine T. Exhaust gas is supplied to the turbine T of the turbocharger TC through the second merging portion 9 and the second upstream flow path 10.

In FIG. 1, the flow path width from the cylinder 6 to the second merging portion 9 is narrower than the flow path width from the cylinder 6 to the first merging portion 7. However, the flow path width from the cylinder 6 to the second merging portion 9 may be equivalent to the flow path width from the cylinder 6 to the first merging portion 7. The flow path width of the second merging portion 9 is narrower than the flow path width of the first merging portion 7. However, the flow path width of the second merging portion 9 may be equivalent to the flow path width of the first merging portion 7. The flow path width of the second upstream flow path 10 is narrower than the flow path width of the first upstream flow path 8. However, the flow path width of the second upstream flow path 10 may be equivalent to the flow path width of the first upstream flow path 8.

One end of an EGR flow path 11 is connected to the second merging portion 9. Another end of the EGR flow path 11 is connected to the surge tank 5. An EGR valve 12 is included in the EGR flow path 11. When the EGR valve 12 opens, exhaust gas flows from the second merging portion 9 to the surge tank 5. The opening degree of the EGR valve 12 may be controllable as appropriate between the states of being fully opened and fully closed. In this manner, the intake and exhaust mechanism 2 includes high pressure-exhaust gas recirculation (HP-EGR).

The turbine T is provided with an exhaust pipe 13 (downstream flow path) and a wastegate flow path 14. The exhaust gas is discharged from the turbine T through the exhaust pipe 13. The wastegate flow path 14 (second wastegate flow path) is connected to the first upstream flow path 8 and the exhaust pipe 13. The wastegate flow path 14 includes an opening and closing valve 15. The wastegate flow path 14 is opened and closed by the opening and closing valve 15. The opening degree of the opening and closing valve 15 may be controllable as appropriate between the states of being fully opened and fully closed.

Figure 2:
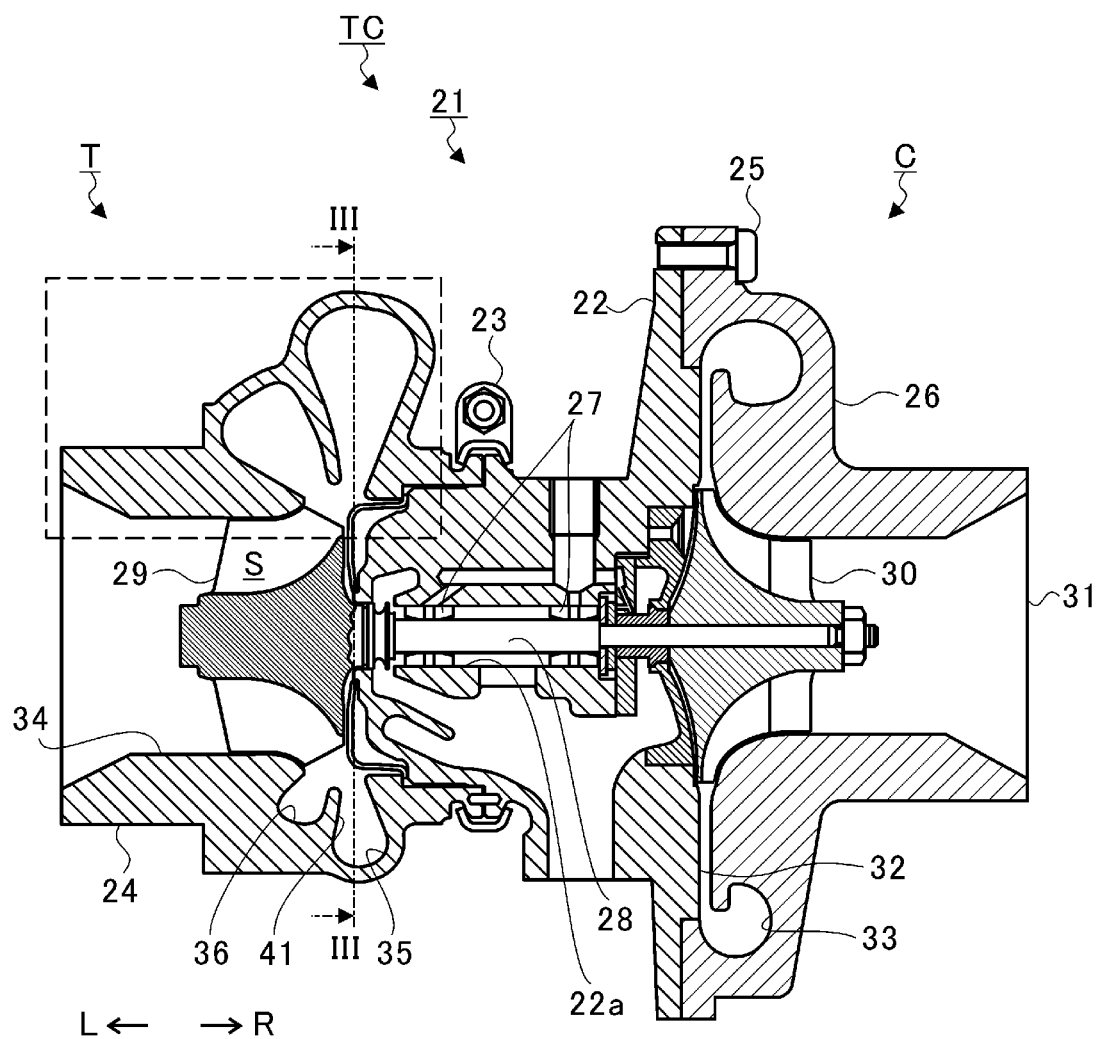
FIG. 2 is a schematic cross-sectional view of a turbocharger.

FIG. 2 is a schematic cross-sectional view of the turbocharger TC. In FIG. 2, illustration of the first upstream flow path 8, the second upstream flow path 10, the exhaust pipe 13, and the wastegate flow path 14 in the turbine T is omitted. Description is given assuming that a direction of arrow L illustrated in FIG. 2 is the left side of the turbocharger TC. Description is given assuming that a direction of arrow R illustrated in FIG. 2 is the right side of the turbocharger TC. As illustrated in FIG. 2, the turbocharger TC includes a turbocharger main body 21. The turbocharger main body 21 includes a bearing housing 22.

A turbine housing 24 is connected to the left side of the bearing housing 22 by a fastening mechanism 23. The fastening mechanism 23 includes, for example, a G coupling. The bearing housing 22 and the turbine housing 24 are band-fastened to each other by the fastening mechanism 23. A compressor housing 26 is connected to the right side of the bearing housing 22 by a fastening bolt 25. The side of the fastening bolt 25 of the turbocharger TC functions as the turbine T. The compressor housing 26 side of the turbocharger TC functions as the compressor C.

A bearing hole 22a is formed in the bearing housing 22. The bearing hole 22a penetrates through the turbocharger TC in the left-right direction. Bearings 27 are provided in the bearing hole 22a. In FIG. 2, full-floating bearings are illustrated as an example of the bearings 27. However, the bearings 27 may be another radial bearing such as a semi-floating bearing or a rolling bearing. A shaft 28 is pivotally supported by the bearings 27 in a freely rotatable manner. A turbine impeller 29 is provided at the left end of the shaft 28. The turbine impeller 29 is freely rotatably accommodated in an accommodation space S formed in the turbine housing 24. Furthermore, a compressor impeller 30 is provided at the right end of the shaft 28. The compressor impeller 30 is accommodated in the compressor housing 26 in a freely rotatable manner.

An intake port 31 is formed in the compressor housing 26. The intake port 31 opens to the right side of the turbocharger TC. An upstream side of the compressor C in the intake flow path 3 is connected to the intake port 31. Furthermore, in a state where the bearing housing 22 and the compressor housing 26 are connected by the fastening bolt 25, a diffuser flow path 32 is formed. The diffuser flow path 32 pressurizes the air. The diffuser flow path 32 is formed in an annular shape from the inner side to the outer side in the radial direction of the shaft 28 (hereinafter, simply referred to as the radial direction). The diffuser flow path 32 communicates with the intake port 31 via the compressor impeller 30 on the inner side in the radial direction.

Furthermore, a compressor scroll flow path 33 is formed inside the compressor housing 26. The compressor scroll flow path 33 is annular. The compressor scroll flow path 33 is positioned, for example, on an outer side with respect to the diffuser flow path 32 in the radial direction of the shaft 28. The compressor scroll flow path 33 is connected with the downstream side of the compressor C in the intake flow path 3. The compressor scroll flow path 33 also communicates with the diffuser flow path 32.

When the compressor impeller 30 rotates, the air is sucked from the intake port 31 into the compressor housing 26. The sucked air is accelerated by the action of the centrifugal force in the process of flowing through blades of the compressor impeller 30. The accelerated air is pressurized by the diffuser flow path 32 and the compressor scroll flow path 33. The pressurized air is guided to each of the cylinders 6 through the surge tank 5.

In the turbine housing 24, a discharge flow path 34 (downstream flow path) is formed. The discharge flow path 34 opens to the left side of the turbocharger TC. The exhaust pipe 13 is connected to the discharge flow path 34. The discharge flow path 34 communicates with the accommodation space S. The discharge flow path 34 extends from the turbine impeller 29 in the rotation axis direction (hereinafter, simply referred to as a rotation axis direction) of the turbine impeller 29.

The turbine housing 24 includes a first turbine scroll flow path 35 (another turbine scroll flow path) and a second turbine scroll flow path 36 (one of turbine scroll flow paths). The first turbine scroll flow path 35 and the second turbine scroll flow path 36 are located on the outer side in the radial direction with respect to the accommodation space S and connected to the accommodation space S. The first turbine scroll flow path 35 communicates with the first upstream flow path 8. The second turbine scroll flow path 36 communicates with the second upstream flow path 10. The exhaust gas guided from the first upstream flow path 8 and the second upstream flow path 10 to the first turbine scroll flow path 35 and the second turbine scroll flow path 36 is guided to the discharge flow path 34 through the blades of the turbine impeller 29. The turbine impeller 29 rotates in the process in which the exhaust gas flows.

The second turbine scroll flow path 36 has a smaller flow path cross-sectional area than that of the first turbine scroll flow path 35. Here, a flow path cross-sectional area of a flow path refers to, for example, an area of a cross section taken along a plane including the rotation axis of the turbine impeller 29 as illustrated in FIG. 2. In addition, the second turbine scroll flow path 36 is positioned on the left side (side separated away from the bearing housing 22 or the bearing 27) in FIG. 2 with respect to the first turbine scroll flow path 35. The first turbine scroll flow path 35 extends radially outward with respect to the second turbine scroll flow path 36. However, the first turbine scroll flow path 35 may extend radially outward to approximately the same position as the second turbine scroll flow path 36. The second turbine scroll flow path 36 may extend radially outward with respect to the first turbine scroll flow path 35. Also in this case, the second turbine scroll flow path 36 has a smaller flow path cross-sectional area smaller than that of the first turbine scroll flow path 35 due to a difference in the shape, such as that the length of the first turbine scroll flow path 35 in the rotation axis direction is longer than the length of the second turbine scroll flow path 36 in the rotation axis direction.

Figure 3:
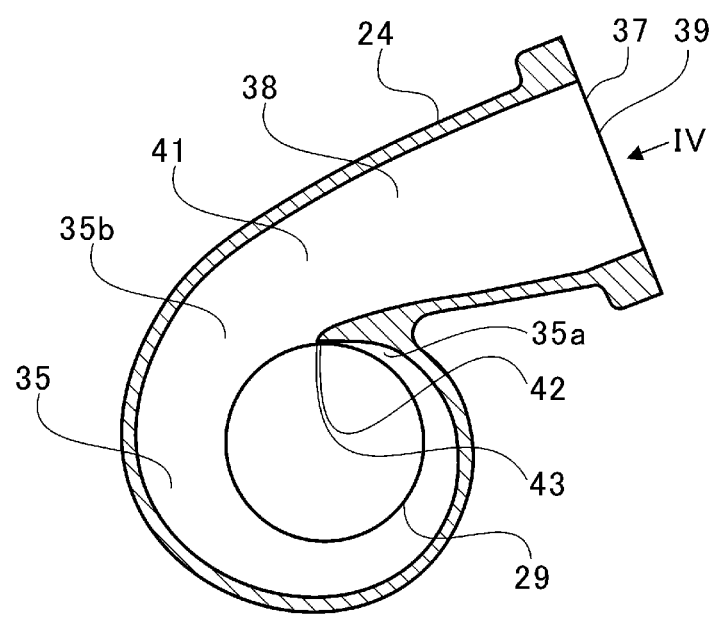
FIG. 3 is a cross-sectional view taken along line of FIG. 2.

FIG. 3 is a cross-sectional view taken along line of FIG. 2. Illustrated in FIG. 3 is a diagram of the turbine housing 24 taken along a plane perpendicular to the axial direction of the shaft 28 and passing through the first turbine scroll flow path 35. In FIG. 3, the turbine impeller 29 is illustrated by a circle. As illustrated in FIG. 3, a first gas inlet 37 is formed in the turbine housing 24. The first gas inlet 37 opens to the outside of the turbine housing 24. The first upstream flow path 8 is connected to the first gas inlet 37.

A first introduction path 38 is formed between the first gas inlet 37 and the first turbine scroll flow path 35. The first introduction path 38 extends substantially linearly. The first gas inlet 37 communicates with the first turbine scroll flow path 35 via the first introduction path 38. The second turbine scroll flow path 36 is positioned on the back side in FIG. 3 with respect to the first turbine scroll flow path 35.

Figure 4:
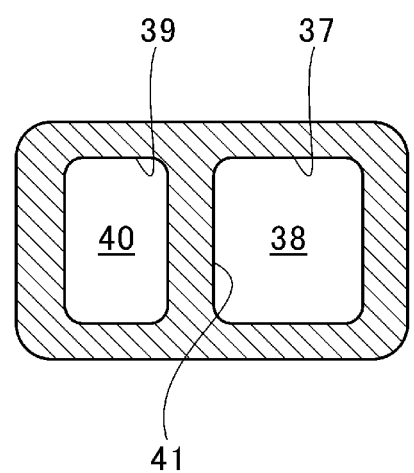
FIG. 4 is an arrow view when viewed from arrow IV of FIG. 3.

FIG. 4 is an arrow view when viewed from arrow IV of FIG. 3. As illustrated in FIG. 4, a second gas inlet 39 is arranged side by side with the first gas inlet 37. The second upstream flow path 10 is connected to the second gas inlet 39. The second gas inlet 39 is smaller than the first gas inlet 37. However, the second gas inlet 39 may have approximately the same size as the first gas inlet 37.

A second introduction path 40 is formed between the second gas inlet 39 and the second turbine scroll flow path 36. A ross-sectional area of the second introduction path 40 is smaller than a flow path cross-sectional area of the first introduction path 38. However, the flow path cross-sectional area of the second introduction path 40 may be approximately equal to the flow path cross-sectional area of the first introduction path 38. The second gas inlet 39 communicates with the second turbine scroll flow path 36 via the second introduction path 40.

A partition wall 41 partitions the first turbine scroll flow path 35 and the second turbine scroll flow path 36, the first gas inlet 37 and the second gas inlet 39, and the first introduction path 38 and the second introduction path 40 (See FIGS. 2, 3, and 4).

Two tongues 42 and 43 are formed in the turbine housing 24. The tongue 42 is included in a downstream portion 35*a* of the first turbine scroll flow path 35. The tongue 42 partitions the first turbine scroll flow path 35 into the downstream portion 35*a* and an upstream portion 35*b*. The tongue 43 is formed on the back side in FIG. 3 with respect to the tongue 42. Like the tongue 42, the tongue 43 is included in a downstream portion of the second turbine scroll flow path 36 and partitions into the downstream portion and an upstream portion.

The two tongues 42 and 43 have the same position in the rotation direction of the turbine impeller 29. As described above, the turbine T is a so-called twin-scroll turbine.

Figure 5:
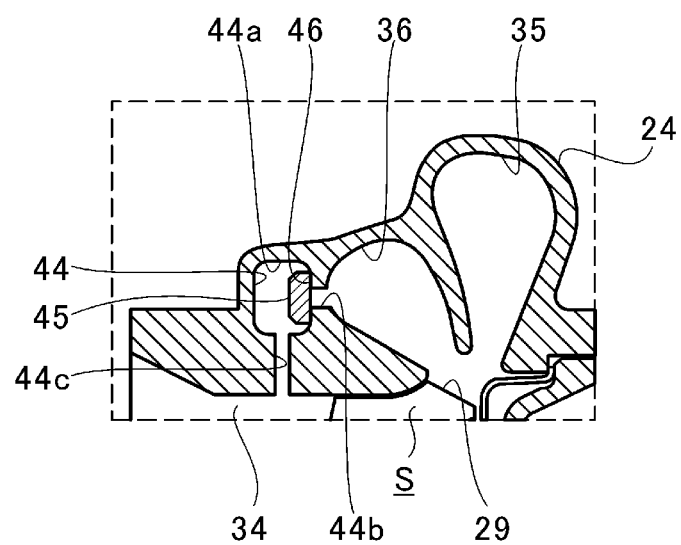
FIG. 5 is a diagram of a broken line part extracted from FIG. 2.

FIG. 5 is a diagram of a broken line part extracted from FIG. 2. The position of the cross section illustrated in FIG. 5 is different from the position of the cross section illustrated in FIG. 2 in the rotation direction of the turbine impeller 29. As illustrated in FIG. 5, a wastegate flow path 44 (first wastegate flow path) is formed in the turbine housing 24. The wastegate flow path 44 opens to the second turbine scroll flow path 36 and the discharge flow path 34. The wastegate flow path 44 allows the second turbine scroll flow path 36 and the discharge flow path 34 to communicate with each other without interposing the accommodation space S (turbine impeller 29) therebetween.

The wastegate flow path 44 includes a valve chamber 44*a*, a first through hole 44*b*, and a second through hole 44*c*. The valve chamber 44*a* is located on a radially outer side with respect to the discharge flow path 34 in the turbine housing 24. The first through hole 44*b* penetrates the turbine housing 24 from the valve chamber 44*a* to the second turbine scroll flow path 36. The first through hole 44*b* extends, for example, in the rotation axis direction. The second through hole 44*c* penetrates the turbine housing 24 from the valve chamber 44*a* to the discharge flow path 34. The second through hole 44*c* extends, for example, in the radial direction.

A valve 45 is included in the valve chamber 44*a*. An opening on an inner wall surface of the valve chamber 44*a* where the first through hole 44*b* is opened is a seat plane 46. The valve 45 abuts on the seat plane 46 when the valve is closed. In this state, the wastegate flow path 44 is closed, and no exhaust gas flows.

Figure 6:
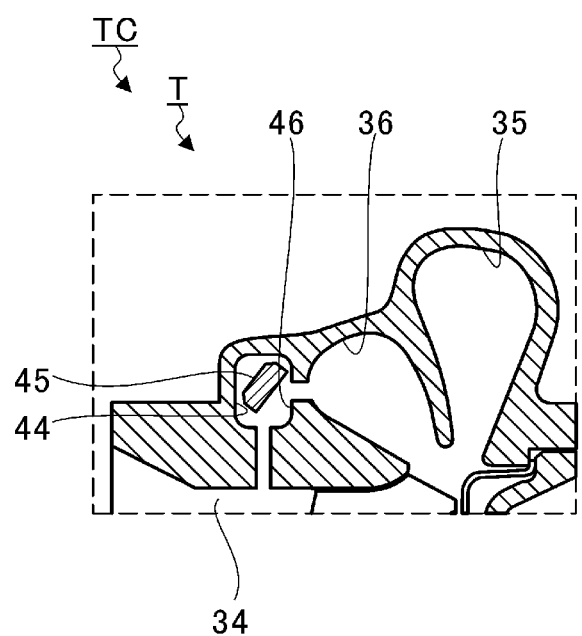
FIG. 6 is a diagram for explaining how a valve opens.

FIG. 6 is a diagram for explaining how the valve 45 opens. The valve 45 is opened and closed by, for example, a drive mechanism (not illustrated) including an actuator. As illustrated in FIG. 6, when the valve 45 is opened while separated from the seat plane 46, a part of exhaust gas flows out from the second turbine scroll flow path 36 to the discharge flow path 34 through the wastegate flow path 44. As a result, overspeeding of the turbine T (turbocharger TC) is suppressed.

The wastegate flow path 44 is separated from the first turbine scroll flow path 35 and is not connected to the first turbine scroll flow path 35. That is, the wastegate flow path 44 is not open to the first turbine scroll flow path 35. For example, it is also conceivable that the wastegate flow path 44 opens to both the first turbine scroll flow path 35 and the second turbine scroll flow path 36. In this case, in the first turbine scroll flow path 35, the flow of the exhaust gas is disturbed by the influence of the opening of the wastegate flow path 44. This disadvantageously results in a pressure loss of the exhaust gas. Since the wastegate flow path 44 is opened only to the second turbine scroll flow path 36, the pressure loss of the exhaust gas is suppressed. In a case where the wastegate flow path 44 opens to both the first turbine scroll flow path 35 and the second turbine scroll flow path 36, the exhaust gas may leak from the first turbine scroll flow path 35 to the second turbine scroll flow path 36. Since the wastegate flow path 44 is opened only to the second turbine scroll flow path 36, such leakage of exhaust gas is avoided.

The second turbine scroll flow path 36 has lower turbine efficiency than the first turbine scroll flow path 35 under predetermined operating conditions. In a case where the flow rate of the exhaust gas is too large, the exhaust gas flows out to the wastegate flow path 44 only from the second turbine scroll flow path 36 having lower turbine efficiency. As a result, the first turbine scroll flow path 35 having higher turbine efficiency is effectively used.

As described above, the flow path cross-sectional area of the second turbine scroll flow path 36 is smaller than the flow path cross-sectional area of the first turbine scroll flow path 35. Therefore, the first turbine scroll flow path 35 has a wider operation area with high turbine efficiency than that of the second turbine scroll flow path 36. Since the exhaust gas flows out to the wastegate flow path 44 only from the second turbine scroll flow path 36, a decrease in turbine efficiency is suppressed in a wide operation area.

As described above, the wastegate flow path 44 opens to the second turbine scroll flow path 36 and the discharge flow path 34. The second turbine scroll flow path 36 is positioned on the side separated away from the bearing housing 22 or the bearing 27 with respect to the first turbine scroll flow path 35. Therefore, the second turbine scroll flow path 36 is closer to the discharge flow path 34 than the first turbine scroll flow path 35 is, and thus the wastegate flow path 44 can be easily installed. However, the second turbine scroll flow path 36 may be positioned closer to the bearing housing 22 or the bearing 27 than the first turbine scroll flow path 35 is.

Figure 7:
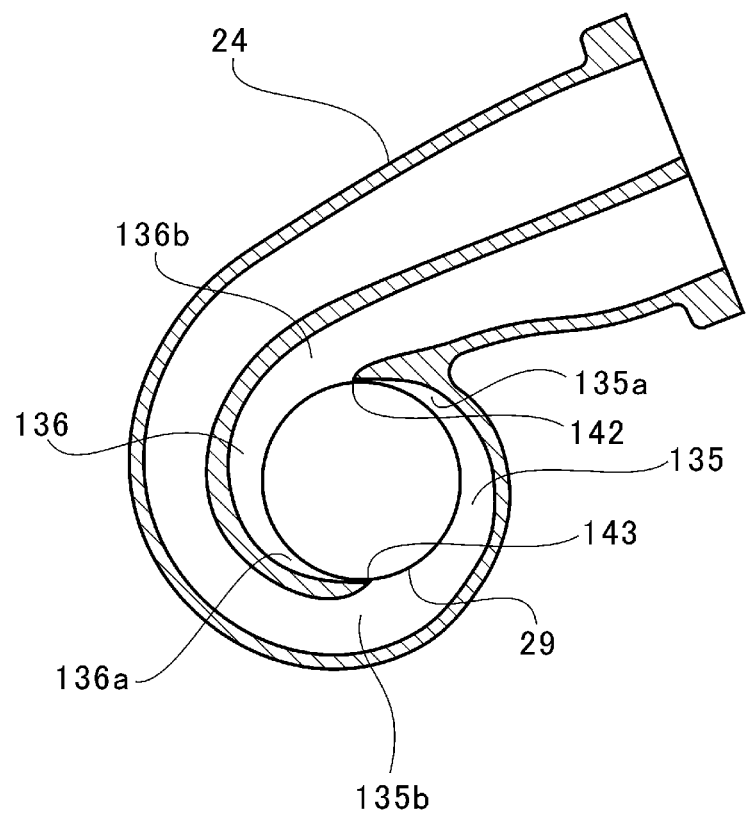
FIG. 7 is a diagram for explaining a modification.

FIG. 7 is a diagram for explaining a modification. As in the above-described embodiment, the first upstream flow path 8 communicates with a first turbine scroll flow path 135 (another turbine scroll flow path) of a modification. The second upstream flow path 10 communicates with a second turbine scroll flow path 136 (one of turbine scroll flow paths). As illustrated in FIG. 7, in the modification, the second turbine scroll flow path 136 is positioned on the radially inner side of the shaft 28 with respect to the first turbine scroll flow path 135. The second turbine scroll flow path 136 extends substantially over a half circumference on the radially outer side of the turbine impeller 29. The second turbine scroll flow path 136 faces the turbine impeller 29 in the radial direction approximately over a half circumference.

The first turbine scroll flow path 135 extends substantially over the entire circumference on the radially outer side of the turbine impeller 29. The second turbine scroll flow path 136 is interposed between the first turbine scroll flow path 135 and the turbine impeller 29 over approximately a half circumference of the turbine impeller 29. The first turbine scroll flow path 135 faces the turbine impeller 29 in the radial direction over approximately a half circumference which is the rest of the first turbine scroll flow path 135 where the second turbine scroll flow path 136 is not interposed.

Two tongues 142 and 143 are formed in a turbine housing 24. The tongue 142 is included in a downstream portion 135a of the first turbine scroll flow path 135. The tongue 142 partitions the downstream portion 135a of the first turbine scroll flow path 135 and an upstream portion 136b of the second turbine scroll flow path 136. The tongue 143 is included in a downstream portion of the second turbine scroll flow path 136. The tongue 143 partitions a downstream portion 136a of the second turbine scroll flow path 136 and an upstream portion 135b of the first turbine scroll flow path 135.

The tongues 142 and 143 are arranged at positions shifted from each other by 180 degrees in the rotation direction of the turbine impeller 29. However, it is only required that the position of the tongue 143 be different from the position of the tongue 142 in the rotation direction of the turbine impeller 29. As described above, the turbine T is a so-called double scroll turbine.

Here, the case where the second turbine scroll flow path 136 is positioned on the radially inner side of the shaft 28 with respect to the first turbine scroll flow path 135 has been described. However, the second turbine scroll flow path 136 may be positioned on the radially outer side of the shaft 28 with respect to the first turbine scroll flow path 135.

Figure 8:
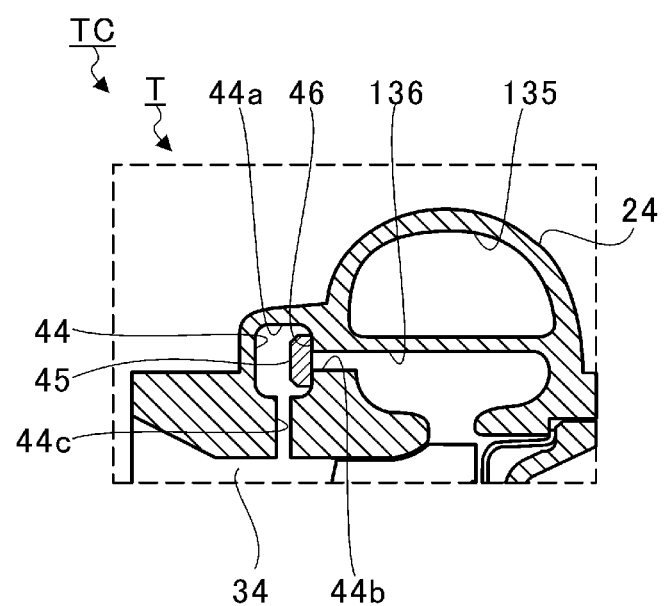
FIG. 8 is a cross-sectional view of a position in the modification that corresponds to FIG. 5.

FIG. 8 is a cross-sectional view of a position in the modification that corresponds to FIG. 5. As illustrated in FIG. 8, the second turbine scroll flow path 136 has a smaller flow path cross-sectional area than that of the first turbine scroll flow path 135. A wastegate flow path 44 is formed in the turbine housing 24. The wastegate flow path 44 opens to the second turbine scroll flow path 136 and a discharge flow path 34.

The wastegate flow path 44 includes a valve chamber 44a, a first through hole 44b, and a second through hole 44c. The wastegate flow path 44 has substantially the same configuration as that of the wastegate flow path 44 described above. A valve 45 included in the valve chamber 44a is opened and closed by, for example, a drive mechanism (not illustrated) including an actuator. When the valve 45 is opened, a part of exhaust gas flows out from the second turbine scroll flow path 136 to the discharge flow path 34 through the wastegate flow path 44. As a result, overspeeding of the turbine T is suppressed.

Also in the modification, as in the embodiment described above, since the wastegate flow path 44 is opened only to the second turbine scroll flow path 136, the pressure loss of the exhaust gas is suppressed. The second turbine scroll flow path 136 has lower turbine efficiency than the first turbine scroll flow path 135 under predetermined operating conditions. As in the above embodiment, the first turbine scroll flow path 135 having higher turbine efficiency is effectively used.

As described above, the flow path cross-sectional area of the second turbine scroll flow path 136 is smaller than the flow path cross-sectional area of the first turbine scroll flow path 135. Therefore, the first turbine scroll flow path 135 has a wider operation area with high turbine efficiency than that of the second turbine scroll flow path 136. Since the exhaust gas flows out to the wastegate flow path 44 only from the second turbine scroll flow path 136, a decrease in turbine efficiency is suppressed in a wide operation area.

Although the embodiment of the present disclosure has been described by referring to the accompanying drawings, it is naturally understood that the present disclosure is not limited to the above embodiment. It is clear that those skilled in the art can conceive various modifications or variations within the scope described in the claims, and it is understood that they are naturally also within the technical scope of the present disclosure.

For example, in the embodiment and the modification described above, the turbine T of the turbocharger TC has been described as an example. However, the turbine T incorporated in a device other than the turbocharger TC or a single turbine T may be used.

In the embodiment and the modification described above, the case in which the turbine T includes the first upstream flow path 8, the second upstream flow path 10, the exhaust pipe 13, and the wastegate flow path 14 has been described. However, the first upstream flow path 8, the second upstream flow path 10, the exhaust pipe 13, and the wastegate flow path 14 may be provided separately from the turbine T.

In the embodiment and the modifications described above, the case in which the wastegate flow path 14 is connected to the exhaust pipe 13 has been described. However, the wastegate flow path 14 may be connected to the discharge flow path 34.

In the embodiment and the modification described above, the case where the wastegate flow path 44 opens to the second turbine scroll flow path 36 or 136 has been described. However, the wastegate flow path 44 is only required to communicate with the second turbine scroll flow paths 36 and 136 and may be opened to, for example, the second introduction path 40.

In the embodiment and the modifications described above, the case where the wastegate flow path 14 is included has been described. In this case, since the exhaust gas in the first upstream flow path 8 flows out from the wastegate flow path 14 to the exhaust pipe 13, the overspeeding of the turbine T is further suppressed. Moreover, the first upstream flow path 8 has a larger flow path cross-sectional area than that of the first turbine scroll flow paths 35 and 135. Since the wastegate flow path 14 opens to the first upstream flow path 8, the influence of the turbulence of the flow of exhaust gas due to the opening is smaller as compared with a case where the wastegate flow path 14 opens to the first turbine scroll flow paths 35 and 135.

In the embodiments described above, the case where the turbine T is a twin-scroll turbine has been described. In this case, there is no difference in the position between the first turbine scroll flow path 35 and the second turbine scroll flow path 36 in the rotation direction of the turbine impeller 29. Therefore, even in a case where the exhaust gas flows out to the wastegate flow path 44 and the flow rate of the second turbine scroll flow path 36 changes relative to the flow rate of the first turbine scroll flow path 35, the rotation axis of the turbine impeller 29 is less likely to swing.

In the embodiment and the modification described above, the case where the flow path cross-sectional area of the second turbine scroll flow paths 36 and 136 is smaller than the flow path cross-sectional area of the first turbine scroll flow paths 35 and 135, respectively, has been described. However, the flow path cross-sectional area of the second turbine scroll flow paths 36 and 136 may be larger than the flow path cross-sectional area of the first turbine scroll flow paths 35 and 135, respectively. The flow path cross-sectional area of the second turbine scroll flow paths 36 and 136 may be approximately equal to the flow path cross-sectional area of the first turbine scroll flow paths 35 and 135, respectively.

In the embodiment and the modification described above, the case where the EGR flow path 11 opens to the second upstream flow path 10 has been described. In this case, the exhaust pressure in the second upstream flow path 10 located upstream of the second turbine scroll flow paths 36 and 136 having a small flow path cross-sectional area is higher than that in the first upstream flow path 8. For example, in a low-load area, the EGR valve 12 is opened, and the exhaust gas efficiently flows out from the second upstream flow path 10 having a high exhaust pressure, to the EGR flow path 11. In a high-load area, the valve 45 is opened, and the exhaust gas efficiently flows out from the second turbine scroll flow paths 36 and 136 having a high exhaust pressure to the wastegate flow path 44. However, the EGR flow path 11 may not be opened to the second upstream flow path 10.

INDUSTRIAL APPLICABILITY

The present disclosure is applicable to a turbine and a turbocharger.

What is claimed is:

1. A turbine comprising:
   a housing;
   a turbine impeller accommodated in an accommodation space formed in the housing;
   two turbine scroll flow paths formed in the housing connected to the accommodation space;
   a first wastegate flow path formed in the housing and directly connected to one of the two turbine scroll flow paths and separated from the other of the two turbine scroll flow paths;
   a discharge flow path formed in the housing, positioned downstream with respect to the turbine impeller, and communicating with the accommodation space, wherein the first wastegate flow path is directly connected to the discharge flow path;
   a valve for opening and closing the first wastegate flow path;
   a first upstream flow path connected to an upstream side of the other turbine scroll flow path and located outside the housing;
   an exhaust pipe positioned downstream with respect to the turbine impeller, communicating with the discharge flow path, and located outside the housing; and
   a second wastegate flow path directly connected to the first upstream flow path and directly connected to the exhaust pipe, the second wastegate flow path located outside the housing,
   wherein the one of the two turbine scroll flow paths has a smaller flow path cross-sectional area than that of the other of the two turbine scroll flow paths, and
   wherein the one of the two turbine scroll flow paths is closer to the discharge flow path in a radial direction of the turbine impeller than the other of the two turbine scroll flow paths.

2. The turbine according to claim 1, wherein positions of tongues comprised in downstream portions of the respective two turbine scroll flow paths are different from each other in a rotation direction of the turbine impeller.

3. The turbine according to claim 2, further comprising:
   a second upstream flow path located upstream with respect to the turbine and communicating with the one of the two turbine scroll flow paths, wherein an EGR flow path is opened to the second upstream flow path.

4. A turbocharger comprising the turbine according to claim 3.

5. A turbocharger comprising the turbine according to claim 2.

6. The turbine according to claim 1, further comprising:
   a second upstream flow path located upstream with respect to the turbine and communicating with the one of the two turbine scroll flow paths, wherein an EGR flow path is opened to the second upstream flow path.

7. A turbocharger comprising the turbine according to claim 6.

8. A turbocharger comprising the turbine according to claim 1.

\* \* \* \* \*